United States Patent [19]

Topping

[11] 4,055,990
[45] Nov. 1, 1977

[54] PIPELINE INSPECTION APPARATUS

[76] Inventor: Frederick Victor Topping, 3 Kirkton Road, Toronto, Canada

[21] Appl. No.: 706,505

[22] Filed: July 19, 1976

[30] Foreign Application Priority Data

July 28, 1975 United Kingdom ............... 31440/75

[51] Int. Cl.² .......................................... G01N 29/00
[52] U.S. Cl. ..................................... 73/623; 73/635; 73/638
[58] Field of Search ............... 73/67.5 R, 67.7, 67.8 S, 73/67.8 R, 67.9

[56] References Cited
U.S. PATENT DOCUMENTS

| 3,205,702 | 9/1965 | Jog | 73/67.8 S X |
| 3,427,866 | 2/1969 | Weighart | 73/67.9 X |
| 3,646,805 | 3/1972 | Walters | 73/67.9 |
| 3,810,384 | 5/1974 | Evans | 73/67.8 S |

*Primary Examiner*—Jerry W. Myracle

[57] ABSTRACT

Apparatus for measuring the thickness of the walls of liquid-bearing pipelines provides a transmitter and a receiver of ultrasonic waves supported to move down the pipelines in spaced relationship to the walls, and provides means associated with the receiver for detecting the reflections of the transmitted waves from both the inner and the outer walls of the pipeline and for recording the time interval between such detections as a measure of pipe thickness.

Another aspect of the invention provides, for measuring the thickness of the walls of gas-bearing pipelines of providing a liquid filled tire which rolls on the pipeline wall as the detecting apparatus travels therealong and which tire and its contained liquid contain the ultrasonic transmitter and receiver.

14 Claims, 8 Drawing Figures

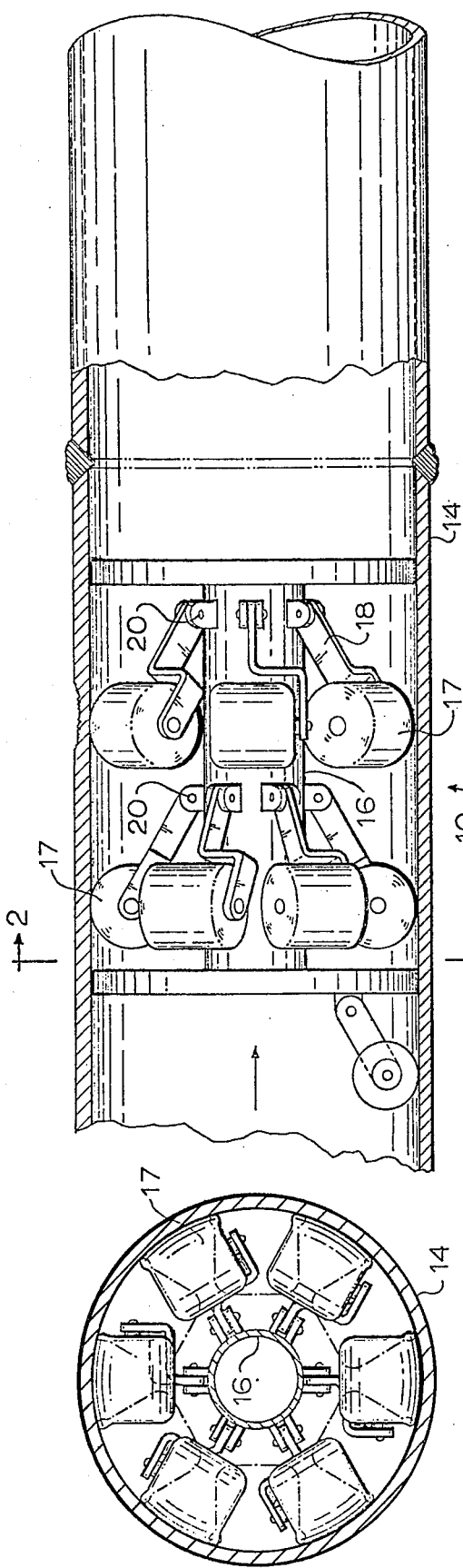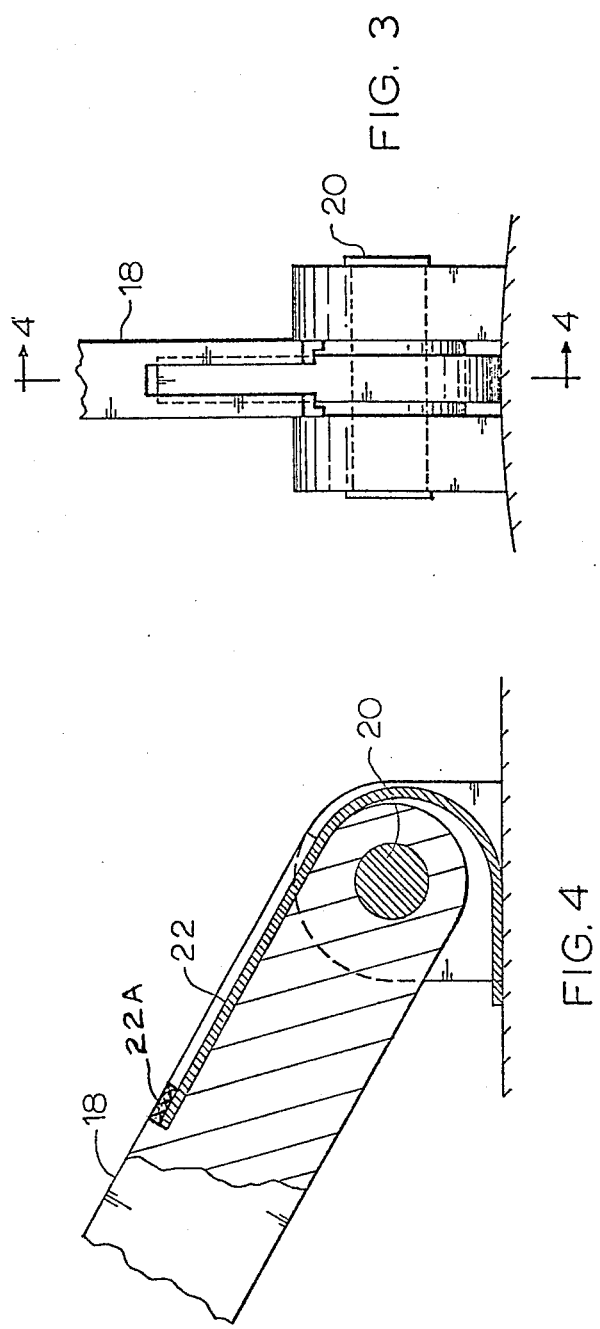

PIPELINE INSPECTION APPARATUS

This invention relates to an inspection system using ultra-sonic radiation for pipelines which carry gases and for pipelines which carry liquids and this invention also relates to means, when the pipeline carries gases, of providing a liquid coupling between the ultrasonic transmitter and receiver, on the one hand, and the pipeline wall on the other hand.

The need for the invention has arisen because metal pipelines (usually made of steel) require ultrasonic inspection devices travelling therealong in order to determine pipeline thickness and consistency and to detect corrosion and gouges and other characteristics of the pipeline walls.

Ultrasonic inspection devices used for inspection of pipelines, provide a transducer which is a radiator of ultrasonic waves coupled to the pipeline wall and a transducer which is a receiver of ultrasonic waves also coupled to the wall which receiver is designed to receive ultrasonic waves resulting from the transmitted waves and reflected from or re-radiated from the pipeline wall.

It is an object of the inspection system, to provide a transmitter of ultrasonic waves and a receiver designed to detect reflections of such ultrasonic waves at the inner and outer surfaces of the pipeline walls. The transmitter and receiver may use common elements in a time shared mode. The receiver is designed to detect the reflections of radiated ultrasonic transmissions from the inner and the outer surfaces of the pipeline wall and to record a measure of the time interval between said reflections to obtain a measure of the pipeline wall thickness.

It is an object of a preferred form of the invention to provide, with the system of the previous paragraph, an odometer movable along the pipeline with the transmitter and receiver, connected to a recorder and designed to provide an indication of location corresponding to the wall thickness measurements.

It is an object of a preferred form of the invention to provide a system of the type mentioned two paragraphs previously wherein either: the detection of the reflection from the outer surface of the pipeline wall (which will arrive at the receiver after the reflection from the inner surface;) or the recording of said detection, is gated to prevent the recording of the pipe thickness where this is as large or larger than the minimum thickness desired. Thus, in this alternative, the record of the inspection is limited to a record of the locations where the thickness due to corrosion or another cause is less than the desired minimum. If necessary, where there are time shared transmitting and receiving elements, it may be necessary to avoid at the receiver and its connected equipment, the detection, as a spurious reflection, of the transmission by the transmitter. To avoid this, the receiver or the recording of the received results therefrom, may be gated for a period after the transmission to avoid such the recording of such spurious reflection, the period being short enough to end before the time for detection of the genuine reflection from the inner surface of the pipeline.

In a preferred form of the invention the transmitter is designed to radiate ultra sonic waves in directions approximately radial relative to the axis of the pipeline to provide ultrasonic waves incident approximately perpendicular to the pipeline walls with corresponding perpendicular reflection to a suitably located receiver. Although the direction of radiation of the ultrasonic waves may have been previously know, the invention provides that the transmitter is designed to radiate the waves in a fan shaped envelope when viewed axially of the pipeline, to produce the shape most efficient, when combined with similar transmitters, for inspecting all or a large proportion of the pipeline surface. The fan shaped envelope is made as thin as possible in the axial direction of the pipeline and is, as closely as possible, made perpendicular to the walls of the pipeline.

Another facet of the invention, where the inspection is to be made of gas carrying pipelines, is the provision of a liquid coupling between the ultra sonic radiator and receiver, on the one hand, and the pipeline walls on the other hand. In accord with a preferred form of the invention this is achieved by providing a tire enclosing the ultrasonic transmitter and receiver, and movable therewith along the pipeline and shaped and designed to roll along the inside surface and comply therewith. The tire is filled with a substantially incompressible liquid, preferably oil, to an extent that it encompasses the path between the transmitter and receiver on the one hand and the pipeline wall on the other. The liquid provides much better ultrasonic coupling between the transmitter and receiver on the one hand and the pipe line walls on the other hand, than gas. The liquid is preferably selected to have a substantially differing velocity of sound from that of the pipeline wall material to ensure substantial reflection at the inner surface of the pipeline wall. (Applicant's British Provision Application No. 31440/75 filed July 28, 1975, forms the basis of the priority claim for this application. In this British Provisional Application it is stated that, as an alternative to the above, the liquid may be selected to have a sound velocity close to that of the pipeline where it is desired to have a lower reflective component in the signal received by the receiver and a higher component of a signal retransmitted from the pipeline walls. Although this is still an alternative within the scope of the invention; it is believed that this alternative is less important than detection methods using the reflected component. Hence, it is believed, in most applications, that the liquids will be selected to have a different sound velocity from that of the pipeline walls). It is desireable to have the detection results influenced as little as possible by the sound transmission characteristics of the tire wall material. Accordingly it is desireable to use for the tire wall a visco-elastic material, which is a material having a "glass transition point". The "glass transition point" is the frequency above which the material acts as a very hard or "glass-like" substance to the ultra sonic waves (although the tire remains compliant with the tire walls). To provide that the ultra sonic signals will have, as nearly as possible, the same velocity as the liquid, the tire wall material and the ultra sonic transmission frequency must be selected, in relation to each other, so that the latter is higher than the glass transition point of the former.

In drawings which illustrate preferred embodiments of the invention:

FIG. 1 shows a vertical cross-section of a gas carrying pipeline with the form of the invention for use with such a pipeline installed therein;

FIG. 2 shows an end view of the inventive device of FIG. 1;

FIG. 3 shows a method of mounting the roller arms on the device shown in FIGS. 1 and 2;

FIG. 4 is a section along the lines 4—4 of FIG. 3;

Figure 7:
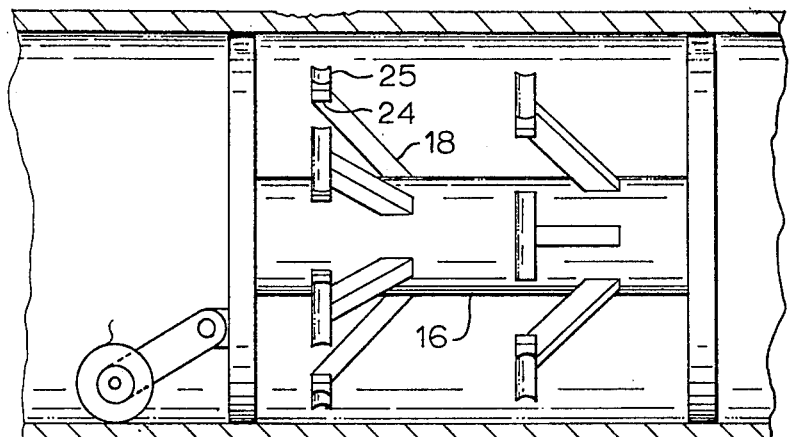
FIG. 7 is a view corresponding to FIG. 1 but showing the form of the inventive device for use with pipelines carrying substantially incompressible liquid (usually oil)

FIGS. 1 and 7 of the drawings show pig 10 for, respectively a gas filled and liquid filled pipeline. The pig comprises forward and rearward compliant pistons 12 and 14 and is driven along the pipeline by the pressure of the fluid travelling thereon. The pistons 12 and 14 are relatively stiff and designed to make a sliding fit with the pipeline walls. They should however be slightly compliant to conform to dents or other irregularities in the pipeline walls, and resilient to regain their shape after deformation. Pistons 12 and 14 are preferably made of polyurethane. Detection of pipeline characteristics is achieved through ultrasonic waves transmitted from transducer 24 and lens 25 to the pipeline wall and consequent radiation travelling back from the pipeline wall to the transducer and lens. This construction will be described in more detail hereafter.

Figure 8:
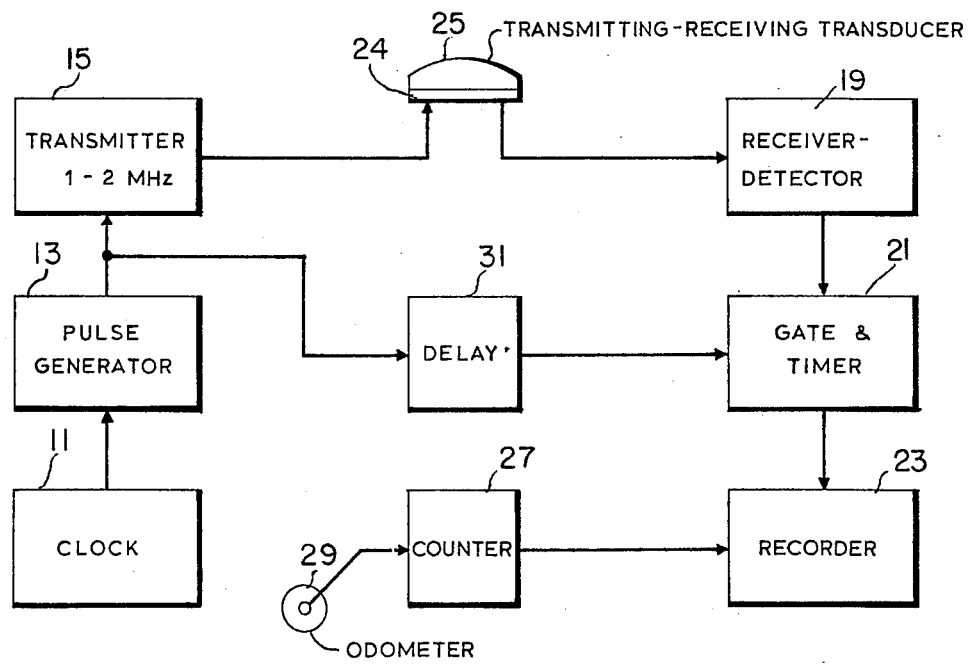
FIG. 8 is a schematic drawing of the detection circuitry.

Since the detection circuitry shown in FIG. 8 will be the same for both the liquid carrying and gas carrying pipelines, it is desired to discuss this first.

The lines shown in FIG. 1 between schematic elements each represent two wires where necessary in accord with the well known scheme of operation of the equipment connected thereto which will be well known to those skilled in the art.

As FIG. 8 shows, a source of clock signals 11 connected to operate a pulse generator 13 which in turn causes the emission of a burst of ultra-sonic radiation from transmitter 15. Transmitter 15 actuates transducer 24 and the latter to be described in more detail hereafter. The transmitter will preferably transmit (and will cause transducer 24 to transmit) at a frequency of between 1 and 2 Megahertz with 1 Megahertz being above the "glass transition point" for the preferred tire material, which is polyurethane.

The transducer 24 operates in accord with the piezo-electric effect which is time shared between the transmitting and receiving mode. Thus the transducer 24 is connected to the receiver detector 19 whose output is connected to a gate and timer 21. The acoustic lens 17 acts to focus the ultra sonic waves emanating from transducer 24 into the beam shape desired for the ultrasonic radiation toward the pipeline walls. The lens is preferably made of polymethyl methacrylate and is sold under the trade mark "Plexiglas" by Rohm and Haas Canada Limited at 2 Manse Road, West Hill, Ontario, Canada. Since a lens of this material has a faster sound velocity that the liquids through which the ultrasonic waves will be transmitted, the lens will as shown be convex outward in the plane perpendicular to the pipeline axis, where it is desired to have a fan shaped beam and will be concave outward, in a plane containing the axis of the pipeline where it is desired to focus or narrow the beam. The pulse generator 13 is also connected to the gate and timer through a delay 25. The output of the gate and timer 21 is supplied to a recorder 23. Also supplied to the recorder is the output of a counter 27 operated by an odometer 29.

In operation, the pulse generator 13 causes the transmitter 15 to emit a burst of electrical signals of ultrasonic frequency selected between 1 and 2 Megahertz which are supplied to the transducer 24. In accord with well known operating principles the electrical signals from transmitter 15 are applied to transducer 24 so as to cause it to vibrate in accord with the piezo-electric effect. It will be appreciated that the transducer 24 has a resonant frequency and the radiation therefrom is produced most efficiently when the frequency of the transmitted signal is at or near the resonant frequency. The resonant frequency of transducer 24 and the transmitter frequency will be chosen with this in mind.

The ultra-sonic transmission emanating from transducer 24 are transmitted by the acoustic lens 17 to the surrounding liquid. The receiver-detector receives the consequent ultra-sonic reflections from the pipeline walls for recording at the recorder. However, because of the time shared aspect of the transducer 24 (in the preferred embodiment) the receiver will also receive signals at the time of transmission and as a result thereof. The gate and timer 21 is therefore designed so that it cannot transmit a signal from the receiver-detector 19 to the recorder until after a signal from the pulse generator (the same signal which started the transmission), delayed by delay 25. The delay 25 is for a sufficient period to prevent the vibrations of transducer 24 during transmission being supplied to the recorder but short enough to allow the gate to 'open' before the receipt of the signal reflected from the inner surface of the pipeline wall.

It will be obvious that it is within the scope of the invention to provide separate transducers for the transmission and the reception of ultrasonic waves. However it should be noted that even with such separate transducers transmissions from the transmitting transducer may be directly received by the receiving transducer and gating will still be required to avoid such reception being treated as a reflection.

The path of the signal from the transducer 24 and lens 17 will be through the liquid either in the pipeline or in a tire, through the tire if such is used, then the first reflection from the inner surface of the pipeline will travel the reverse of the above route back to the lens and transducer. A part of the transmitted wave will also pass into the pipeline wall and a substantial portion of this will be reflected at the interface of the outer surface of the pipeline wall with the air or other medium outside the pipeline. The path back to the lens and transducer for the wave from the second reflection is the reverse of its outward course.

The difference in time of reception of the first and second reflections will be a measure of the time for the ultra-sonic acoustic waves to pass twice through the pipeline wall. (With a steel wall of ¾ inch thickness and a speed therethrough for the ultra-sonic waves, this difference in time will be approximately eight millionths of a second or 8.25 $\mu$ seconds).

Thus by recording at the recorder the incidence at the receiver-detector of the first and second reflection (or the interval of time between them) a measure of the thickness of the pipeline wall may be recorded so that if the wall has become thin, through corrosion or otherwise, this will be apparent from the measurements. If desired a record may only be made in the event that the thickness (i.e. difference time interval) measurement shows the wall to be less than a minimum acceptable thickness. In this alternative mode of operation the gate and timer are designed to commence timing on receiving the first reflected pulse. The timer and gate are then designed to "close" the gate, at the end of the time interval thereafter, equivalent to the minimum acceptible pipe thickness. Thus the only second reflections recorded before the gate closes will be those resulting from wall thicknesses below the acceptible minimum.

In order that the undesired reflection at the liquid tire interface shall be less than the desired reflection at the tire-pipeline wall interface, the tire material will be chosen to have a sound velocity (above the glass transition point) closer to that of the liquid than to that of the pipeline wall. It will be noted that this is true with the polymers referred to on page 12 where the pipeline (as is customary) is made of steel.

In either mode of operation of the gate, timer, and recorder: the displacement measurements resulting from odometer 29 and counter 27, are, over the detection period, supplied to the recorder to provide an indication of location correlated to the thickness measurement.

In a gass pipeline, where a liquid filled tire is used, tire material, with its "glass transition point" is selected to have the speed of sound therethrough as close as possible to that of the liquid medium in the tire, to minimize reflections, back to the detector, from the liquid tire interface. The preferred tire material is polyurethane. Where desirable, to prevent detection of this reflection, a threshhold device may be provided, (preferably at the output of the receiver detector), to prevent detection of reflections below a level between that resulting from the tire-oil interface and that resulting from the tire-pipeline wall interface.

It is now desired to discuss the physical arrangement of the liquid coupling between the transducer and the pipeline wall for a gas filled pipeline.

In such a gas filled pipeline, as with a liquid filled pipeline, there is required good coupling between the ultrasonic transducers and the pipeline material, so that the radiation from the radiating transducer 24 (and through lens 25) is received with sufficient intensity by the pipeline wall and so that transmissions reflected or re-radiated by the wall are received with sufficient intensity by the receiving transducer (here 24 through lens 25). Acoustic coupling of the transducers to the pipeline wall material is difficult where the contents of the pipe are air or natural gas or another compressible gas. The term 'transducer' is thus used to cover both the device which transforms input electrical energy to output ultrasonic energy and also the device which transforms ultrasonic energy received from the pipeline wall into electrical energy for detection or recording.

Our invention, in this aspect, comprises using a roller or tire mounted to roll along the inner wall of pipeline, and designed (along with its supporting mechanism) to contain the transducers and to be filled with a liquid medium. The liquid medium is selected because it is incompressible and therefore provides a good coupling medium.

We prefer to use as a coupling medium, which is of course also the inflation medium for the tire, oil which has a sound velocity sufficiently close to that of the metal wall to provide good coupling. To obtain reflective measurements from the inside walls of the pipe, a certain amount of difference will be desireable between the velocity of sound in the medium and in the pipeline wall.

The choice of the type of oil used will be determined not only by the sound velocity therein but also by the viscosity since the transducer will be contained therein and in the preferred embodiment the transducer will be stationary while the oil moves thereabout.

The wall of the tire acts, not only to contain the liquid medium but also to couple the liquid medium to the pipe wall for ultrasonic transmission purposes. The wall of the roller or tire therefore must be of a material which is compliant as it rolls along the wall, in order to conform to the contours of the pipe. Another requirement of the tire wall material is that it must be an efficient conductor of high frequency acoustic waves.

In order that the tire wall material be an efficient conductor of high frequency acoustic waves, the material must act like a very hard or 'glass' like substance at the frequency transmitted and received by the transducer (although compliant in rolling along the pipeline). By the term 'frequency' in this context, we mean not only the frequency of a sinusoidal signal which might be sent out and recieved by the transducer but also, if a pulse is used, the equivalent frequency calculated from the initial rise rate of the pulse. (We prefer to use a burst of signals of the selected frequency and to detect the reflected envelope of the burst). Thus the substance of the tire wall, compliant to the irregularities of the pipe must, at the transducer frequencies, provide 'hard' characteristics, with a Youngs Modulus of about $10^{10}$–$10^{11}$ dynes per square centimeter. Substances which provide the ordinary compliance of a tire but are 'hard' to high frequencies are known as 'visco-elastic' and the frequency at which the substance becomes 'hard' to the transducer signals is known as the 'glass transition point'. Thus the substance chosen must have a 'glass transition point' below that of the ultrasonic frequency used. Many polymers are available with such characteristics and some rubbers. It is preferred to use the polymer, polyurethane. Polyurethane and the other polymers having the desired glass transition point not only provide an excellent material for the transmission of the acoustic waves employed but it is found that such polymers may be formulated over a wide range of compliances to provide a range of such compliances suitable for the tires of this application.

In order to better understand this facet of the invention, approximate sound velocity values in feet per second are provided.

| Material | Velocity Ft./Sec. |
| --- | --- |
| Gases generally | 600 - 2,200 |
| Air and Natural Gas | 1,100 |
| Liquids generally | 3,800 - 5,600 |
| Oil | 5,000 |
| Metals generally | 5,000 - 20,000 |
| Steel | 15,000 |
| Polymers with suitable glass transition point and pliable for tire or roller wall | 5,000 |
| Plexiglass | 8,800 |

FIGS. 1-6 of the drawings show what may be called pig 10 for lack of a better designation comprising forward and rearward propulsion pistons 12 and 14, resilient and compliant as before, each designed to make a sliding fit with the pipeline walls and rigidly joined by a tube or other rigid connection 16. One, two or more circles of tires 17 are mounted on the bar and spring loaded against the pipeline walls by means hereinafter discussed. On each circle of tires a number of tires say 10-14 are distributed about the bar to roll upon the pipeline wall in the travel direction of the pig. The tires 17 are preferably equiangularly distributed about the bar 16 which corresponds to the axis of the pipe. Preferably the tires are provided in two or more tiers or circles in order that they may be angularly staggered and cover all or substantially all of the surface of the pipe during the travel of the pig thereodown. Although 10-14 of such tires may be mounted in a single circle only 6 of these are shown for clarity.

Each of the tires, as shown in FIG. 1 is mounted adjacent one end of an arm 18. The other end of the arm 18 is pivotally mounted on the centre bar on a pivotal axis 20 which allows the wheel to be spring biased by leaf springs 22 as shown in FIGS. 3 and 4 against the pipeline walls. Thus a biasing pressure presses each tire against the pipeline wall. It will be appreciated that another method of spring biasing may be used if desired. Springs 22 may be attached to arm 18 by welding 22A or in any other manner.

The tires are preferably made of polyurethane having a suitable glass transition point below the frequency of the ultra-sonic radiation used.

Figure 5:
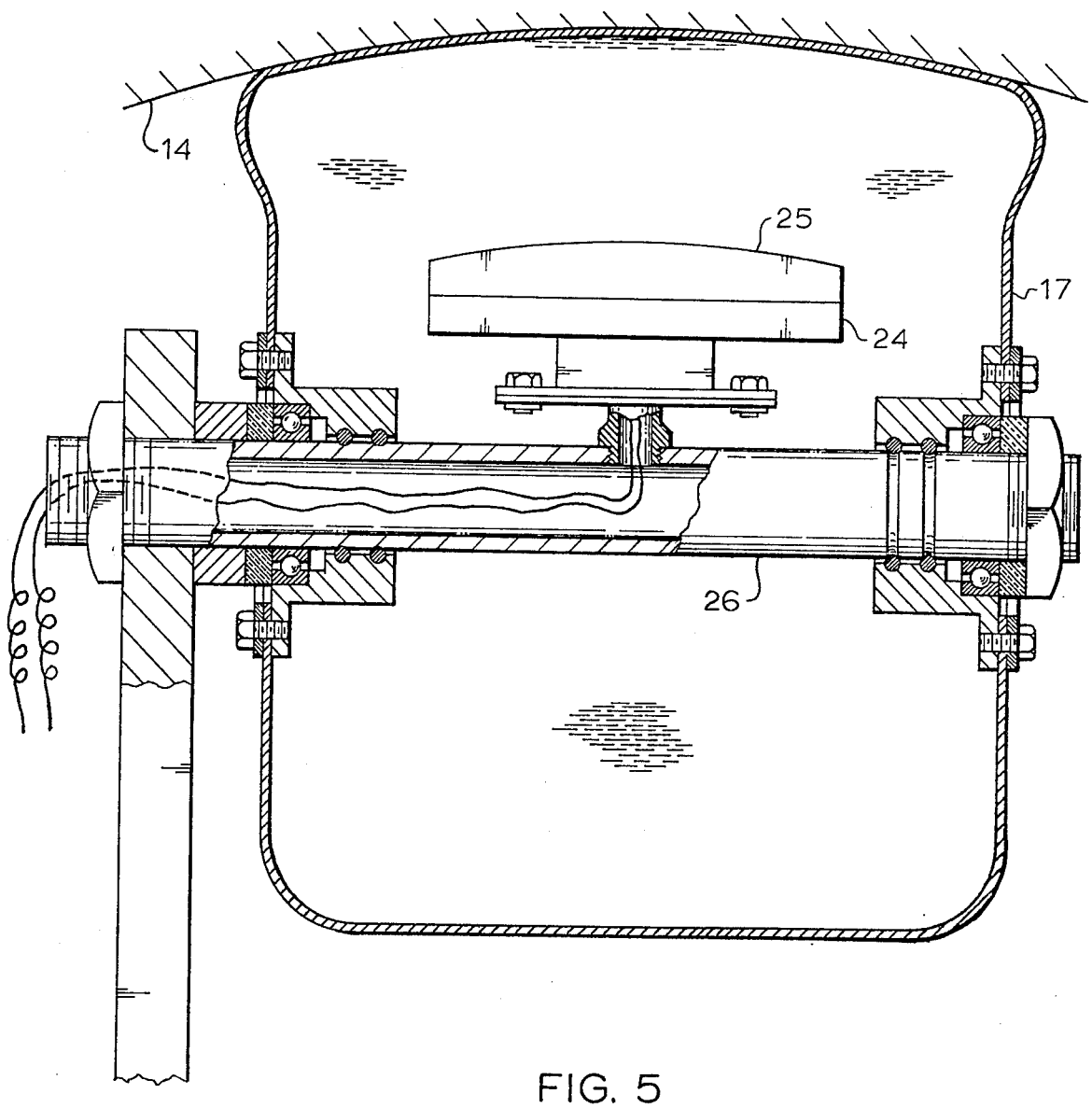
FIG. 5 is a view of the apparatus inside one of the tires shown in FIGS. 1-4.

As shown in FIG. 5 the inside of the tire is filled with the liquid for acoustic coupling, preferably oil. The tire wall is preferably made of pliable plastic peferably sufficiently thick that it will not puncture or tear. The liquid filling is such that the tire wall be relatively soft and will conform to the pipeline contour. The tire is preferably rotatably mounted on a stationary shaft 26 and the transducers both for the radiation and reception of acoustic energy will be mounted to be stationary on the shaft and are here schematically shown with focussing lenses as the assembly 24, 25. Although the tire is filled only to an extent to leave it compliant, it must of course contain enough oil to surround lens 25 so that there is an oil path from the lens to the tire wall at the pipeline, and back. The viscosity of the oil will be chosen to be as thin as possible to ensure that the friction of oil moving about the transducer will be as small as possible.

(It is within the scope of the invention to have the shaft and the transducer rotating with the wheet although the problems of coupling the electrical connections to the transducer will be somewhat more complex).

The transducers 24 are preferably of rectangular cross-section, small relative to the length thereof, as shown. The transducer 24 is of a material which will efficiently vibrate in accord with the piezo-electric effect. The preferred material is lead zirconate titanate or barium titanate. The electric connections from the transmitter to the transducer are not shown as the mode of making these is well known to those skilled in the art. In the preferred form of the invention the transducer is made as a simple rectangular prism while the shaping of the beam of ultra sonic radiation is achieved by an acoustic lens 25 placed in front of the transducer and designed to transmit the ultrasonic waves emitted by the transducer. The len material is preferably Plexiglas (polymethyl methacrylate) having a velocity of sound of approximately 8800 ft/sec, somewhat faster than that of the oil filling the tire. In the other alternative arrangement, the velocity of sound in Plexiglas will be faster than the velocity of sound in the liquids carried by the pipeline. For this reason, to obtain the desired shape, the lens is made convex in its contour, viewed axially of the pipeline and concave viewed transverse to the pipeline. The convex contour is designed to produce a fan-shaped envelope of radiating ultrasonic waves where the waves are approximately radial relative to the axis of the (substantially cylindrical) pipeline, to produce reflection from the inner and outer surfaces of the pipeline walls, in a direction as nearly as possible the reverse of the transmission direction. This will produce the maximum reception by the transducer (through the lens) in its receiving mode. The fan shaped envelope is desired to produce the most efficient shape for detecting a predetermined arc about the pipeline wall as the transducer travel therealong and the most efficient shape for providing, in combination with the other, differently oriented transducers, complete coverage of the circumference of the pipeline wall. The concave shape of the lens, viewed perpendicular to the pipeline axis, is desired to produce approximate focussing or at least a narrow beam (viewed perpendicular to the pipeline axis), directed perpendicular to the pipeline walls in this viewing direction. Obviously if the lens material has a speed of sound less than that of the liquid the convex and concave shapings will be respectively, reversed.

An odometer 29 is mounted on the rear of the device, spring-biased and connected to roll on the pipe as the pig moves therealong and the output of the odometer is connected as shown in FIG. 8.

Figure 6:
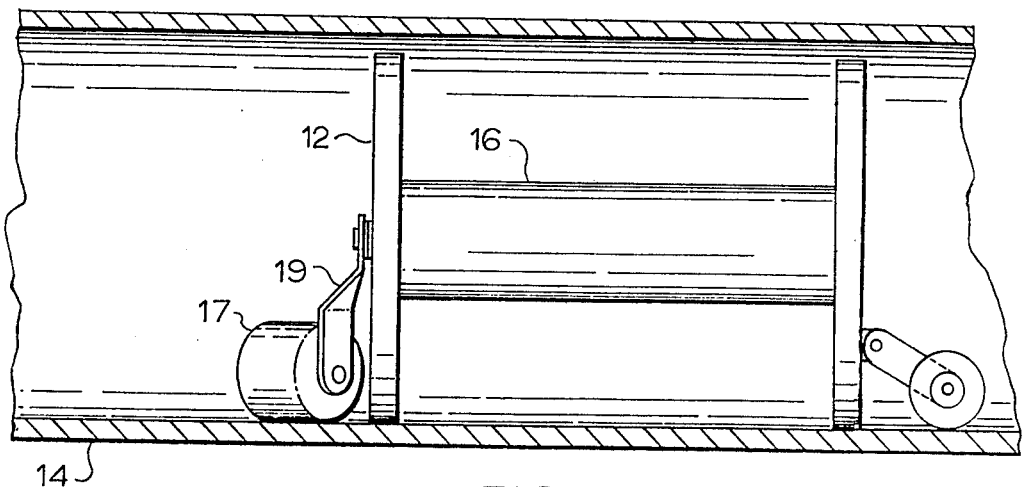
FIG. 6 shows a method of mounting a tire on a "pig" which is an alternative to that shown in FIGS. 1-5.

FIG. 6 shows an alternative mounting for the tire of the invention and should be compared with FIG. 1. FIG. 6 again shows a sliding pig having forward piston 14, rearward piston 12 joined by tube 16. However the multipled tires 17 are replaced with one or more (here one) tire 17 mounted on an arm 19 mounted on rearward piston 12 to rotate about an axis, co-axial with that of the pipeline. The tire 17 is mounted to bear on the pipeline wall but the tire rotatable axis is offset as shown to produce helical travel of the tire as it is moved down the pipe. The helical travel of the tire is designed to cause it to produce an acoustic survey of the walls of the pipeline. To obtain fuller coverage, two or more of such helically movable tires may be similarly mounted if desired. If contact of the tire on arm 19 is not assured by the combination of the length of arm 19 and the pliancy of tire 17 then some variety of spring biasing may be provided. The design of the inside of the tire shown in FIG. 6 is similar to that shown in FIG. 5. An odometer may, in this alternative, be mounted on the front of the device and connected as shown in FIG. 8.

Another alternative within the scope of the invention occurs where the pig is allowed to rotate. In this event, the use of helical travel to achieve a survey of all sides of the pipe may be achieved by the apparatus, otherwise as shown in FIG. 1 but having the tires all offset at the same angle from their attitude as shown in FIG. 1 to produce a helical component in the roller travel and rotation of the pig in the pipeline.

FIG. 7 shows the form of the pig and the associated apparatus for use in a liquid-carrying pipeline. Since such liquids are to a large degree incompressible the liquid filled tires are not required since the coupling medium is provided by the liquid in the pipe. The arms supporting the transducers are therefore fixed rather than pivotally mounted as in FIG. 1. The transducer and lens arrangement will be the same as in the embodiment of FIGS. 1-6. The odometer will be arranged as in FIG. 1. The system for transmitting, receiving, gating and detection will be as shown in FIG. 8.

I claim:

1. Means for measuring the thickness of a gas-bearing pipeline wall comprising:

supporting means for supporting, in spaced relation to the inner surface of the wall of the wall of a pipeline, a transmitter of and a receiver of ultra-sonic waves, a tire, filled with liquid, shaped and designed to contain said transmitter and said receiver and pivotally mounted on said supporting means so that said tire will roll on the inner surface of said pipeline, when said supporting means travel along said pipeline, said supporting means being designed to be moved along said pipeline by the gas therein, means, when ultrasonic radiation is transmitted from said transmitter, for detecting, at said receiver, the reception of that reflection of such radiation, which is reflected from the inner surface of the pipeline, and for detecting at said receiver the reception of that reflection of such radiation, which is reflected from the inner surface of the pipeline, and for detecting at said receiver the reception of that reflection of such radiation, which is reflected at the outer surface of the pipeline, and means for recording the time between reception of reflections from the outer and inner surfaces.

2. Means as claimed in claim 1 including means for recording detections by said receiver and means preventing such recording for a period greater than the time for transmission of ultrasonic radiation to such inner surface and less than the time for receipt of reflection from the inner surface of said pipeline, whereby the transmission by said transmitter is not detected as a reflection at said receiver.

3. Means as claimed in claim 2 including means for measuring the travel of said supporting means along said pipeline and for correlating said travel measurement with said reflection detections.

4. Means, as claimed in claim 1, including means for recording detections by said receiver and means preventing the recording of such detections received more than a predetermined time after receipt of the reflection from the inner surface of said pipeline.

5. Means as claimed in claim 4 including means for measuring the travel of said supporting means along said pipeline and for correlating said travel measurement with said reflection detections.

6. Means as claimed in claim 1, including means for measuring the travel of said supporting means along said pipeline and for correlating said travel measurement with said reflection detections.

7. Means as claimed in claim 1 wherein said transmitter is designed to radiate a beam fan-shaped when viewed longitudinally of the pipeline, the radiations forming the beam being designed to radiate from the transducer approximately radially relative to the axis of the pipeline, said beam being designed to be relatively narrow measured axially of the pipeline.

8. Means for measuring the thickness of walls of a liquid bearing pipeline comprising:

means for supporting, in spaced relation to the inner surface of the wall of a pipeline, a transmitter of and a receiver of ultra-sonic waves, said supporting means being designed to be moved along said pipeline by the liquid therein, means, when supersonic radiation is transmitted from said transmitter, for detecting at said receiver, the reception of that reflection, of such radiation reflected at the inner surface of the pipe, and for detecting as said receiver the reception of that reflection of said transmitted radiation, reflected at the outer surface of the pipe, and means for recording the time interval between reception of the reflections from the outer and inner surfaces, including means for recording detections by said receiver and means preventing the recording of such detections received more than a predetermined time after receipt of the reflection from the inner surface of said pipeline.

9. Means for measuring the thickness of walls of a liquid bearing pipeline comprising:

means for supporting, in spaced relation to the inner surface of the wall of a pipeline, a transmitter of and a receiver of ultra-sonic waves, said supporting means being designed to be moved along said pipeline by the liquid therein, means, when supersonic radiation is transmitted from said transmitter, for detecting at said receiver, the reception of that reflection, of such radiation reflected at the inner surface of the pipe, and for detecting at said receiver the reception of that reflection of said transmitted radiation, reflected at the outer surface of the pipe, and means for recording the time interval between reception of the reflections from the outer and inner surfaces, including means for measuring the travel of said supporting means along said pipeline and for correlating said reflection deflections.

10. Means for coupling ultrasonic inspection devices to the walls of gas-filled pipelines comprising:

a transmitter and a receiver of ultrasonic waves;

means for transporting such transmitter and receiver along a gas-filled pipe line;

said means for transporting being provided with a tire designed to roll along the inner surface of the pipeline with the transporting means;

said tire being constructed of material so as to comply with the surface of the pipeline as it rolls therealong and designed to contain said transmitter and receiver, said tire being filled with a substantially incompressible liquid and said transmitter and receiver being located to transmit ultrasonic radiation into and to receive ultra-sonic radiation from said liquid.

11. Means as claimed in claim 10 wherein said liquid is one having a velocity of sound different from the velocity of sound in steel.

12. Means as claimed in claim 11 wherein the material forming the walls of the tire is visco-elastic and has a glass transition point below the frequency of the radiation transmitted by said radiator.

13. Means as claimed in claim 10 wherein the material forming the walls of the tire is visco-elastic and has a glass transition point below the frequency of the radiation transmitted by said transmitter, and a sound velocity closer to that of the liquid than that of the pipeline wall.

14. Means for measuring the thickness of walls of a liquid bearing pipeline comprising:

means for supporting, in spaced relation to the inner surface of the wall of a pipeline, a transmitter of and a receiver of ultra-sonic waves, said supporting means being designed to be moved along said pipeline by the liquid therein, means, when supersonic radiation is transmitted from said transmitter, for detecting at said receiver, the reception of that reflection, of such radiation reflected at the inner surface of the pipe, and for detecting at said receiver the reception of that reflection of said transmitted radiation, reflected at the outer surface of the pipe, and means for recording the time interval between reception of the reflections from the outer and inner surfaces, wherein said transmitter is designed to transmit such radiation in the form of a beam, fan-shaped when viewed longitudinally of the pipeline, the radiations forming the beam being designed to radiate from the transmitter approximately radially relative to the axis of the pipeline, said beam being designed to be relatively narrow measured axially of the pipeline.

* * * * *